United States Patent
Tonkin

[15] 3,664,266
[45] May 23, 1972

[54] PEDESTRIAN TRANSPORT CONVEYOR INSTALLATIONS

[72] Inventor: Stephen W. Tonkin, Bristol, England

[73] Assignee: Dunlop Holdings Limited, London, England

[22] Filed: Feb. 10, 1970

[21] Appl. No.: 10,184

[30] Foreign Application Priority Data

Feb. 21, 1969 Great Britain..........................9,611/69

[52] U.S. Cl..............................104/25, 198/16 MS, 198/110
[51] Int. Cl.........................................................B65g 17/06
[58] Field of Search.................104/25; 198/16 MS, 110, 181

[56] References Cited

UNITED STATES PATENTS

| | | | |
|---|---|---|---|
| 3,580,182 | 5/1971 | Bouladon | 104/25 |
| 3,242,876 | 3/1966 | Berggren | 104/134 |
| 3,315,612 | 4/1967 | Reid | 104/25 |
| 3,238,893 | 3/1966 | Zuppiger | 104/25 |

Primary Examiner—Drayton E. Hoffman
Assistant Examiner—D. W. Keen
Attorney—Stevens, Davis, Miller & Mosher

[57] ABSTRACT

A variable speed passenger conveyor comprising a multiplicity of rhomboid shaped platforms mounted in slidable relation to each other along their contiguous sides.

8 Claims, 6 Drawing Figures

PATENTED MAY 23 1972

PEDESTRIAN TRANSPORT CONVEYOR INSTALLATIONS

This invention relates to conveyor installations for conveying loads from one location to another. It is particularly, though not exclusively, concerned with passenger conveyor installations and is an improvement over the conveyor disclosed in U.S. Pat. No. 3,580,182 of May 25, 1971.

A disadvantage of conveyors is that the speed at loading, and unloading, positions must be kept down to a low minimum. For example, in existing pedestrian conveyors, they normally run for their full length at about 1.5 m.p.h. as this is considered to be the approximate maximum transition speed to or from stationary ground that a person having a below-average agility can manage. This means that the time taken to travel between stations is relatively high.

In conveyors for freight and similar goods, for safety reasons and to avoid damage, it is necessary to restrict the speed of the conveyor at loading and unloading positions.

To permit an increase in the speed of travel it has been proposed to provide accelerating and decelerating feeder conveyors which enables transition to be made to or from a main high-speed conveyor, while at the same time maintaining the transition speed at an acceptable value.

A feeder conveyor generally comprises a series or plurality of treads, or platforms, which move along tracks and are so arranged that the treads move at a high speed adjacent the main conveyor and then slow down and enter a zone where they travel at a relatively low speed. From a zone of relatively low speed the treads speed up until they are moving adjacent the main conveyor.

In the present invention each tread or platform is of rhomboid shape having opposite sides and opposite angles equal, two angles being acute and two obtuse, each tread extending only part-way across the width of the feeder conveyor with its longer diagonal extending generally in a direction parallel to the length of the high speed conveyor, adjacent treads being slidably interlocked one with another along all adjacent edges.

The shape of the treads or platforms and the slidable interlocking enables the feeder conveyor to be disposed substantially in one plane, with acceleration and deceleration areas leading to and from the main conveyor and on the same side of the conveyor. Installation is thus simplified. Also, if the main conveyor is full or potential passengers change their minds, it is possible to remain on the feeder conveyor and continue back to a deceleration zone.

A particularly useful shape is a diamond (i.e. a rhombus), all the treads or platforms of equal size and shape. In the present arrangement the treads or platforms are interconnected by upward and downward facing tongues and grooves interfitting to prevent lateral separation of adjacent treads while permitting relative sliding.

The invention will be understood by the following description of an embodiment, by way of example, in conjunction with the accompanying diagrammatic drawings, in which.

Figure 1:
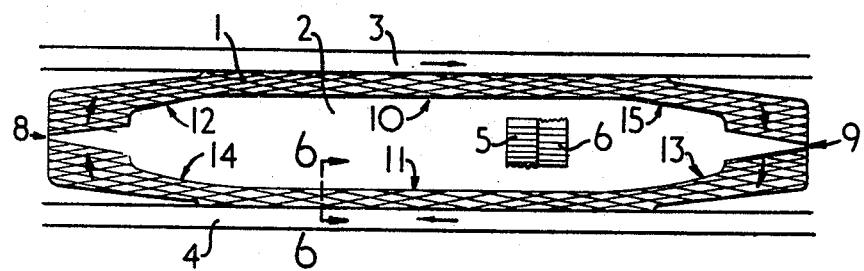
FIG. 1 shows a plan view of a feeder conveyor having accelerating and decelerating portions positioned between a pair of high-speed main conveyors moving in directions opposite to each other.

Referring to FIG. 1, a feeder conveyor 1 positioned to travel round a central island 2 serves a pair of high speed conveyors 3 and 4. Stairs or escalators 5 and 6 provide access to the island.

Figure 2:
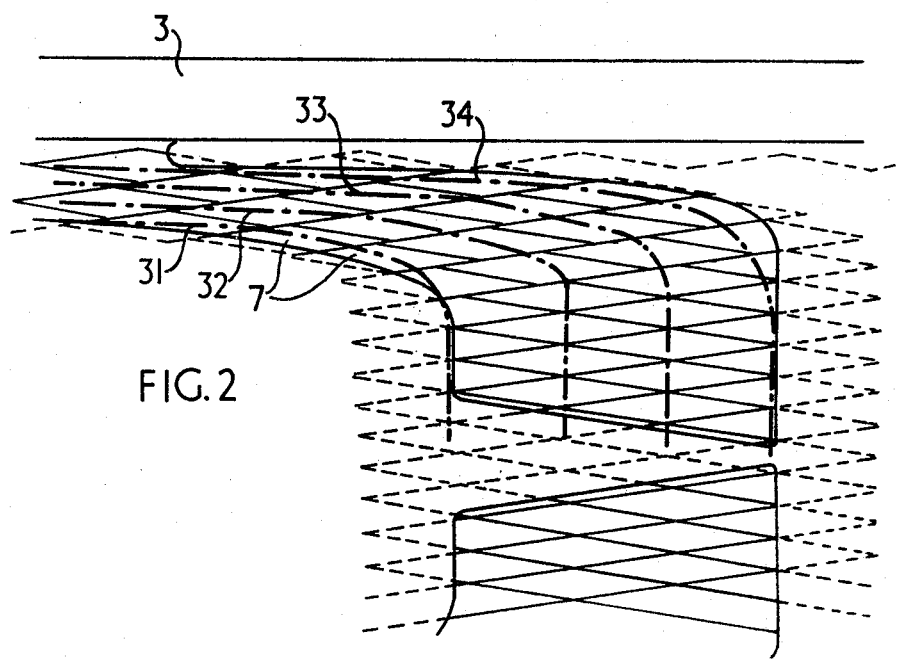
FIG. 2 shows a corner of the feeder conveyor of FIG. 1 in more detail.

As shown in FIG. 2, the feeder conveyor 1 is built up from a number of diamond shaped treads or platforms 7 which are able to slide relative to each other so as to form low speed sections 8 and 9, high speed sections 10 and 11, intermediate or accelerating sections 12 and 13, and intermediate or decelerating sections 14 and 15.

Figure 3:
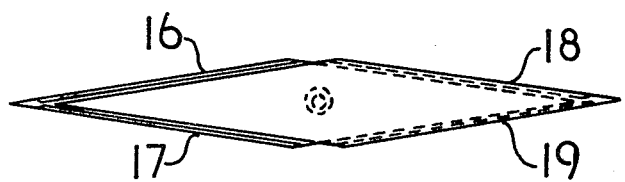
FIG. 3 is a plan view of a single tread.
Figure 4:
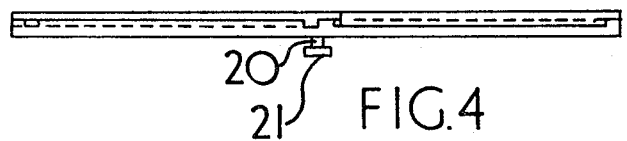
FIG. 4 is a side elevation of the tread shown in FIG. 3.
Figure 5:
FIG. 5 is a section through the interlocked edges of two adjacent treads showing the upward and downward facing tongues and grooves.

Each tread 7, as shown in FIG. 3 is provided with a pair of upwardly tongued and grooved edges 16 and 17, and a pair of downwardly tongued and grooved edges 18 and 19. The tongues and grooves of all adjacent edges of adjacent treads engage with each other to prevent lateral separation but allow sliding of one tread relative to another.

Depending from the center of the undersurface of each tread is a spigot 20 which acts as an axle for a horizontal wheel 21 which runs in a guideway beneath the treads. There are a number of guideways extending along the endless path which each tread or group of treads has to follow around the conveyor circuit. The guideways are indicated in FIG. 2 by the chain-dotted lines 31, 32, 33 and 34.

Figure 6:
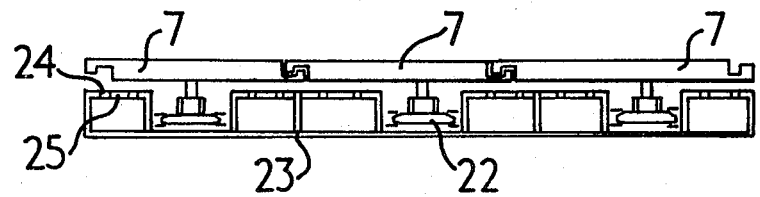
FIG. 6 is a diagrammatic cross-section on the line 6–6 of FIG. 1 illustrating a support means for treads.

The treads 7 are driven by means of drive pulleys (not shown) and chains 22 (FIG. 6) which engage with the spigots along the straight constant-high-speed sections 10 and 11 of the conveyor circuit. The method of engagement between the chain and the spigots may vary and is not illustrated in detail. For example, upstanding pins on the chain may engage in holes in the ends of the spigots or the spigots may have extensions for engaging with the chain. The important requirement is that easy engagement and disengagement can occur. A shallow trough 23 beneath the treads houses the drive mechanism and provides a ducting for the supply of pressurized air to the undersurfaces of the treads. The air acts on the undersurfaces of the treads or platforms, through perforations 24 in the top surfaces 25 of the trough 23. The treads will accordingly be raised slightly above the surfaces 25, thereby reducing friction in the system.

As the band of treads forming the feeder conveyor presents a saw-tooth edge along its sides adjacent the main conveyor, it is preferable to form a similarly toothed edge to the main conveyor so that no gap exists between the feeder conveyor and the main conveyor. A separate toothed belt may be used to fill the gap, however, in which case the main conveyor may be straight sided. The separate toothed belt would extend along the length of the feeder conveyor and would be doubled underneath itself along its return path.

It will be seen that in the straight high-speed sections 10 and 11 the treads 7 are arranged symmetrically corner-to-corner with their shorter diagonals in alignment across the width of the conveyor band, which is narrow in those high-speed sections. As the treads 7 leave the end of a straight high-speed section 10 or 11 and are guided by the guideways into the decelerating sections 14 or 15, they will slide relatively to one another without rotation, changing their pattern and forming into a band of increased width, accompanied by a corresponding deceleration to a reduced speed, until they enter the section 8 or 9 of constant low speed where they are again arranged symmetrically corner-to-corner but with their longer diagonals in alignment across the width of the conveyor band. Similar sliding motion and changing pattern of the treads creates the acceleration in the sections 12 and 13 leading back into the high-speed sections 10 and 11. The treads are not driven through their spigots 20 while they are outside of the high-speed sections 10 and 11, and their movement through the accelerating and decelerating sections and the low-speed sections is produced entirely by the action of their interconnected sliding edges through which thrust from the positively-driven treads in the high-speed sections 10 and 11 is transmitted. In this way a constant-speed positive drive can be maintained in the high-speed sections 10 and 11 and will produce the required varying speeds of travel in the remaining sections of the endless path of the conveyor.

In the illustrated arrangement in which the treads are all of equal rhomb shape (i.e. each has four sides of equal length), and are arranged with their longer diagonals always parallel to the direction of movement of the main high-speed conveyors 3 and 4 of the high-speed sections 10 and 11, the ratio of the constant velocity of the feeder conveyor in the low-speed sections 8 and 9 to the constant velocity in the high-speed sections 10 and 11 is equal to the ratio of the shorter diagonal to the longer diagonal of each tread or platform which ratio may conveniently be about 1:7; giving the possibility of a low speed of about 1.5 m.p.h. in the sections 8 and 9 where pedestrians step on and off the feeder conveyor from rest, accompanies by a high-speed in excess of 10 m.p.h. in the sections 10 and 11 equal to that of the main conveyors 3 and 4.

It is considered, however, that a feeder conveyor may be constructed out of rhomboid-shaped tiles, whose adjacent sides are not of equal length, giving the possibility of an assymetrical conveyor path in which the low-speed sections do not travel at right-angles to the high-speed sections. Further, forms of support other than by air, can be used. For example, the treads or platforms can move over support frames, having rollers or balls.

What we claim is:

1. A load carrying conveyor including a low speed section, an intermediate acceleration section and a high speed section, comprising:
   a. a plurality of rhomboidal platforms;
   b. guide means for the platforms;
   c. drive means for moving the platforms;
   d. edge formations on each platform to interlock adjacent platforms so as to allow only relative sliding between said adjacent platforms;
   e. the guide means maintaining the orientation of each platform such that its longer diagonal is kept substantially parallel to the length of the conveyor;
   f. the platforms positioned to extend across the low speed section in end-to-end relationship and subsequently extend across the high speed section in side-by-side relationship whereby in the intermediate section the width of the conveyor is changed to allow for the change in speed.

2. A conveyor as claimed in claim 1 wherein the platforms have all their sides of equal length.

3. Apparatus as claimed in claim 1 wherein the platforms are supported by pressurized air.

4. Apparatus as claimed in claim 1 wherein the drive means for moving the platform comprises means extending for at least part of the high speed section.

5. Apparatus as claimed in claim 4, wherein the drive means comprises a chain engaging with projections on the platforms.

6. Apparatus as claimed in claim 1 including a support structure including a trough extending beneath the platforms, means for supplying pressurized air to the trough whereby, in operation, the pressurized air acts on the underside of the platforms to support them.

7. A passenger carrying installation comprising a high speed main conveyor and a passenger loading and unloading system comprising at least one feeder conveyor providing acceleration and deceleration sections, the feeder conveyor comprising; a plurality of platforms each of rhomboid shape, each platform adapted to extend with its longer diagonal extending sub-stantially in a direction parallel to the longitudinal axis of the main conveyor; formations on the edges of the platforms for slidably interlocking the platforms together whereby the platforms can slide relative to one another and thereby vary the width of the feeder conveyor; means for driving the high speed section of the feeder conveyor at a predetermined speed; and guide means for the platforms, whereby the guide means controls the sliding of the platforms relative to each other to provide a narrow high speed section, a wide low speed section and intermediate sections of varying width and speed, the high speed section of the feeder conveyor moving alongside the main conveyor.

8. A passenger carrying installation as claimed in claim 7, wherein the platforms have their sides of equal length.

* * * * *